United States Patent
Schild

(10) Patent No.: US 10,715,983 B2
(45) Date of Patent: Jul. 14, 2020

(54) METHOD AND DEVICE FOR COUPLING ELECTRONIC APPLIANCES TO A MOTOR VEHICLE

(71) Applicant: Continental Automotive GmbH, Hannover (DE)

(72) Inventor: Bernhard Schild, Wetzlar (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/772,778

(22) PCT Filed: Oct. 28, 2016

(86) PCT No.: PCT/EP2016/076120
§ 371 (c)(1),
(2) Date: May 1, 2018

(87) PCT Pub. No.: WO2017/076777
PCT Pub. Date: May 11, 2017

(65) Prior Publication Data
US 2019/0239049 A1    Aug. 1, 2019

(30) Foreign Application Priority Data
Nov. 2, 2015  (DE) .......... 10 2015 221 436

(51) Int. Cl.
*H04W 4/80*   (2018.01)
*B60W 50/14*  (2020.01)
(Continued)

(52) U.S. Cl.
CPC ........... *H04W 4/80* (2018.02); *B60R 16/023* (2013.01); *B60W 50/14* (2013.01); *B60W 50/16* (2013.01);
(Continued)

(58) Field of Classification Search
CPC ........................................ H04W 4/80
See application file for complete search history.

(56) References Cited

U.S. PATENT DOCUMENTS

| | | | |
|---|---|---|---|
| 2011/0187498 A1* | 8/2011 | Flaherty | G08B 6/00 340/5.72 |
| 2013/0007771 A1 | 1/2013 | Dash et al. | |
| 2014/0344062 A1* | 11/2014 | Lamont | G06Q 30/0267 705/14.64 |
| 2015/0015386 A1 | 1/2015 | Langenhan | |

(Continued)

FOREIGN PATENT DOCUMENTS

| | | |
|---|---|---|
| CN | 103944976 A | 7/2014 |
| CN | 104093619 A | 10/2014 |

(Continued)

OTHER PUBLICATIONS

Darius Schuiszill "Myo im Test: Gadget-Armband erlaubt Gestensteuerung von i Tunes and Co."; XP002766112, Apr. 10, 2015; retrieved from the Internet: URL:https://www.netzwelt.de/news/152112-my-o-test-gadget-armband-erlaubt-gestensteuerung.html on Jan. 18, 2017; the whole document.

(Continued)

*Primary Examiner* — Ankur Jain

(57) ABSTRACT

A system, consisting of a vehicle having an infotainment system, a mobile data processing device and a motion sensing device, wherein a first communication interface is set up to transmit control commands $I_S$ from the motion sensing device to the mobile data processing device, the mobile data processing device is set up to translate the control commands $I_S$ into instructions $I_A$ to the infotainment system, and a second communication interface is set up to transmit the instructions $I_A$ from the mobile data processing device to the infotainment system.

16 Claims, 1 Drawing Sheet

(51) Int. Cl.
*B60W 50/16* (2020.01)
*B60R 16/023* (2006.01)
*H04W 88/02* (2009.01)

(52) U.S. Cl.
CPC .................. *B60K 2370/146* (2019.05); *B60K 2370/1464* (2019.05); *H04W 88/02* (2013.01)

(56) References Cited

U.S. PATENT DOCUMENTS

| | | |
|---|---|---|
| 2015/0053066 A1 | 2/2015 | Hampiholi et al. |
| 2015/0245198 A1 | 8/2015 | Fliege |
| 2015/0352953 A1* | 12/2015 | Koravadi ............... B60K 37/06 701/36 |
| 2016/0150357 A1* | 5/2016 | Jung ................. H04W 52/0206 455/41.1 |

FOREIGN PATENT DOCUMENTS

| | | |
|---|---|---|
| CN | 104417457 A | 3/2015 |
| CN | 104641622 A | 5/2015 |
| CN | 104838335 A | 8/2015 |
| DE | 102012208179 A1 | 11/2013 |
| DE | 102012216919 A1 | 5/2014 |

OTHER PUBLICATIONS

International Search Report and Written Opinion dated Feb. 20, 2017 from corresponding International Patent Application No. PCT/EP2016/076120.

* cited by examiner

METHOD AND DEVICE FOR COUPLING ELECTRONIC APPLIANCES TO A MOTOR VEHICLE

BACKGROUND

The present invention relates to a method and an apparatus for coupling electronic devices, in particular for electronically coupling to the infotainment system of a motor vehicle. Such an apparatus can also be referred to as a network node and is in particular a smartphone that is set up to transmit control commands from a motion sensing device to an infotainment system.

Modern vehicles have a wide bandwidth of information and multimedia systems. These include radio, navigation system, onboard computer, CD, DVD and Blu-Ray players, Internet and mobile radio functions and the like. This large number of systems and functions is combined under the term in-vehicle infotainment (IVI).

So as not to excessively restrict a vehicle driver's attention in the road traffic through the operation of IVI systems, various operating concepts have been developed in the past. These include, by way of example, buttons and switches fitted directly to the steering wheel, combination control elements in the central console, voice control and the like.

Specifically in the area of control by motion detection, a lot of new systems have been developed over the past few years. The motion detection systems also include what are known as "wearables", in which the input equipment is already present inside an item of clothing and the communication of which takes place e.g. using Bluetooth Low Energy (BLE). These systems are, in principle, also suitable for controlling IVI systems. Most motion detection systems have only a limited number of communication interfaces that they can use to communicate with other devices, however.

IVI systems, too, offer for the most part only a small number of communication interfaces that external devices can use to connect. In this case, it is assumed that the software architecture of the IVI system provides a logical user interface that can be accessed externally by means of a communication interface. Such a user interface generally includes at least the commands forward/up and backward/down for the purpose of navigation within lists, and possibly further navigation commands. Optionally, the indication of a step size for such navigation, for example derived from the intensity of the input, may also be possible, from which e.g. a scroll speed can be derived.

Hence, it would be advantageous if there were a possibility of being able to control any system, such as e.g. an WI system, using as many different controllers as possible without this requiring said controllers to have interfaces that are explicitly attuned to one another or compatible. Further, it would be advantageous to be able to connect different output devices for confirming a control input without this requiring the WI system to have specifically attuned interfaces. Rejection of inputs can also be announced in this way, e.g. by means of specific vibration inside "wearables".

BRIEF SUMMARY

The present invention achieves this object by providing a system according to claim 1 and by means of a mobile data processing device, the use thereof and a method for transmitting control commands. The advantageous refinements of the invention are presented in the subclaims.

A system according to the invention consists of a vehicle having an infotainment system, a mobile data processing device and a motion sensing device. A first communication interface is set up to transmit control commands $I_S$ from the motion sensing device to the mobile data processing device. The mobile data processing device is set up to translate the control commands $I_S$ into instructions $I_A$ to the infotainment system. A second communication interface is set up to transmit the instructions $I_A$ from the mobile data processing device to the infotainment system.

The infotainment system can comprise various components that can be used in vehicles for providing information, for controlling the vehicle and for entertainment. Said components include, by way of example, navigation systems, multimedia systems (radio, CD, DVD and Blu-Ray players, etc.), on-board computers, Internet and mobile radio units, output devices, such as screens and loudspeakers, and input devices, such as keys, touch-sensitive screens, joysticks, multifunction buttons and the like. The mobile data processing device may be a portable device that is set up for processing data, for example a mobile phone, a smartphone, a tablet PC, a notebook or the like. The mobile data processing device can use an operating system such as Android, iOS, Windows mobile, etc. as a platform for programs. The motion sensing device may be a device that uses particular sensors to detect movements and/or gestures of a user and convert them into control signals, for example a Myo armband or a "wearable" (clothing with input equipment). Said sensors may be acceleration sensors, position sensors, force sensors (strain gauges, etc.), cameras having suitable image analysis programs, sensors for sensing muscle contractions (Myo sensors) and the like. The first communication interface allows a data interchange between the motion sensing device and the mobile data processing device. The data interchange can be effected in both directions, from the motion sensing device to the mobile data processing device, and vice versa. However, at least transmission of information from the motion sensing device to the mobile data processing device is possible via the first communication interface. The first communication interface may be a wireless communication interface such as e.g. Wireless Fidelity (WiFi), Near Field Connection (NFC)/Radio Frequency Identification (RFID), Bluetooth, Bluetooth Low Energy (BLE) and the like. The second communication interface allows a data interchange between the mobile data processing device and the infotainment system. Typically, the second communication interface may likewise be a wireless communication interface, the same types of communication interfaces as for the first communication interface being suitable. According to a variant embodiment, however, it is also possible for the second communication interface to be a wired communication interface. The data interchange via the two communication interfaces can preferably be effected in both directions, from the motion sensing device via the mobile data processing device to the infotainment system, and vice versa from the infotainment system via the mobile data processing device to the motion sensing device. However, at least transmission of information from the mobile data processing device to the infotainment system is possible. The second communication interface may particularly preferably be of a different type, or use a different protocol, than the first interface and may be a wireless communication interface, such as e.g. WiFi, NFC/RFID, Bluetooth, BLE and the like. Ordinary mobile data processing devices, such as mobile phones or smartphones, usually have more types of communication interfaces than infotainment systems in motor vehicles. Hence, it is advantageous for such mobile data processing devices to be used in the system according to the invention as a network node between the infotainment system and the motion sensing device. This allows motion sensing devices to communicate with the infotainment system of a motor vehicle even though the infotainment system itself has no suitable communication interfaces at all for communicating with the motion sensing device.

In light of the hardware equipment of older infotainment systems, which, although they include a radio, support neither WiFi nor LAN or Bluetooth, the second communication interface from the mobile data processing device to the infotainment system may be configured as "radio transmission" by means of FM transmitter. In this case, the control commands can be transmitted to the infotainment system via the Radio Data System (RDS) by taking into consideration the software structure already existing in the infotainment system for event processing, e.g. in the form of RDS-TAs (traffic announcements) with values that are innocuous for any ongoing navigation. It is also possible for the control commands to be transmitted within the program name (PS code, program service name) or the RDS radio text (RT code) provided for the transmission of e.g. artist and music track.

Equipment of the infotainment systems with FM and RDS support in particular for TAs has been constantly available for years, which means that an older infotainment system only requires a change of software.

Analogously to the previous solution, a "radio transmission" can use digital radio systems such as DAB (Digital Audio Broadcasting). In light of the fact that higher-quality infotainment systems had had dual tuners installed even in the past, an additional transmission of control commands can also be realized such that these systems do not require radio use to be restricted during simultaneous use of the FM transmitter if the background tuner takes care of this minimal communication outlay in addition to its original tasks.

Preferably, the mobile data processing device may be set up to combine multiple control commands $I_S$ into one or more instructions $I_A$.

This variant embodiment is preferred in particular if an earlier infotainment system is used that has a less complex software structure. It is then possible for the control commands $I_S$ to be processed in the data processing device, which translates the input made by the user via the control commands $I_S$ into instructions $I_A$ that are comprehensible to the infotainment system.

Data or information can be transmitted from a transponder of the motion sensing device, e.g. a BLE transponder, to the mobile data processing device via the first communication interface, e.g. a BLE interface. The mobile data processing device can receive data/information via the first communication interface by means of a first transponder, e.g. a BLE transponder. Further, the mobile data processing device can transmit data/information to the infotainment system via the second communication interface by means of a second transponder. The infotainment system can receive data/information via the second communication interface by means of a transponder.

A data processing program (software) of the mobile data processing device, for example referred to as an application, can evaluate received control commands $I_S$ and translate them into instructions $I_A$ for controlling the infotainment system. In this case, at least one control command $I_S$ is translated into at least one instruction $I_A$ in each case, that is to say m control commands $I_S$ into n instructions $I_A$, where $1<=m$ and $1<=n$.

Movements of the user or vehicle driver can be sensed, interpreted and assigned to control commands $I_S$ by the motion sensing device. These control commands $I_S$ can be transmitted from a transponder of the motion sensing device, e.g. a BLE transponder, to the mobile data processing device via the first communication interface, e.g. a BLE interface. The mobile data processing device can receive control commands $I_S$ via the first communication interface by means of a first transponder, e.g. a BLE transponder. Further, the mobile data processing device can translate the control commands $I_S$ into instructions $I_A$ and can transmit said instructions to the infotainment system via the second communication interface by means of a second transponder (may physically also be the same transponder as the first transponder). The infotainment system can receive the instructions $I_A$ via the second communication interface by means of a transponder. The received instructions $I_A$ can be detected and evaluated by a program of the infotainment system. In accordance with the instructions $I_A$, the infotainment system can perform the actions desired by the user, based on the received instructions $I_A$. The processing of instructions $I_A$ can be performed by an input event handling process in the infotainment system.

Accordingly, the system can be used when the infotainment system is controlled by means of movements of a user/vehicle driver by the motion sensing device. The use of the mobile data processing device as a network node allows the infotainment system to be controlled by the motion sensing device without the communication interfaces of the two components just mentioned needing to be changed.

Preferably, the first communication interface is set up to use a Bluetooth Low Energy protocol. Further, the second communication interface may preferably be set up to use a Bluetooth or Wireless Fidelity or USB protocol.

The mobile data processing device allows the motion sensing device to communicate indirectly with the infotainment system, even though the motion sensing device and the infotainment system use different communication interfaces. The infotainment system can therefore be controlled by the motion sensing device using the mobile data processing device as a network node.

The control commands $I_S$ are preferably provided for navigating and selecting functions and/or information of the infotainment system. In this case, it is left to the infotainment system to also apply these control commands to a screen integration of further devices connected to the infotainment system, for example based on Apple's carplay, Android Auto, Mirrorlink, etc.

Therefore, the system according to the invention can be used by a user to control the infotainment system of a vehicle by means of movements and/or gestures, e.g. with his hands (control movement). This does not require the user to avert his eyes from the road or the traffic in order to look for buttons or the like on the dashboard of the vehicle; rather, he can use simple movements/gestures to trigger the desired action in the infotainment system or to retrieve a desired piece of information from the infotainment system.

Specifically for remote access via wired or wireless communication interfaces, the infotainment system can make an interface available with instructions $I_A$. This interface can include, at an abstract level, at least the instructions "next entry"/"up" and "previous entry"/"down" for the purpose of navigation in lists. There may also be provision for further instructions for navigating in regard to directions such as "left", "right", "up", "down" and finer divisions in order also to be able to navigate in nested lists, tree structures and e.g. on map representations. Further, besides the direction instruction, it is also possible for a step size to be indicated, normally on the basis of the intensity of the input movement. It is thus possible for e.g. the speed of a fast forward to be controllable, for example by the intensity of the input movement, for example speed of movement, radius of movement, etc. Overall, these direction instructions can also relate to 3-dimensional space, e.g. if a screen visually displays 3-dimensional objects intended to be used for navigation.

The second communication interface may preferably be set up to transmit acknowledgement responses $I_{RA}$ from the infotainment system to the mobile data processing device. The mobile data processing device may preferably be set up to translate its acknowledgement responses $I_{RA}$ into responses $I_R$ to the motion sensing device or acknowledgements $I_{RM}$, $I_{RM'}$, . . . to optional further output devices. The first communication interface may preferably be set up to transmit the responses $I_R$ from the mobile data processing device to the motion sensing device.

Further, the motion sensing device can inform the user in regard to the obtained response $I_R$ "in sensory fashion"; alternatively or in addition, a separate output device totally independent of the motion sensing device can also deliver this "sensory" information to the user.

The data processing program of the mobile data processing device, e.g. an app, can evaluate received acknowledgement responses $I_{RA}$ and translate them into responses $I_R$ to the motion sensing device, or acknowledgements $I_{RM''}$ to the output device(s). The term "acknowledgement responses $I_{RA}$" in this case denotes signals that are transmitted by the infotainment system as a reaction to instructions. The responses IR, or the optional acknowledgements $I_{RM}$, $I_{RM'}$, . . . , can be sent e.g. as confirmation of successfully translated and executed commands. The translated responses $I_R$ can come from different sources, but preferably from the infotainment system. In this case, the responses $I_R$ can also signify qualified rejections, for example as a result of user errors.

So that the user or vehicle driver does not have to turn his attention away from the traffic in order to check successful performance of the command associated with a gesture by the infotainment system, the responses $I_R$ transmitted from the mobile data processing device to the motion sensing device can be converted into acknowledgement actions, such as vibration or a confirmation tone by the motion sensing device, for example. Alternatively or in addition, output devices that are not connected to the motion sensing device itself can also generate a sensory confirmation signal of this kind, for example vibration, on the basis of an applicable acknowledgement from the mobile data processing device. The infotainment system can to this end transmit positive or negative acknowledgement responses $I_{RA}$, based on successful or unsuccessful execution of an instruction $I_A$, to the mobile data processing device via the second communication interface. The mobile data processing device translates the acknowledgement responses $I_{RA}$ into responses $I_A$ for transmission to the motion sensing device, or into acknowledgements $I_{RM}$ for transmission to the alternative/additional output devices, and transmits these via the first communication interface, or the further communication interfaces.

It is further optionally possible for one or more output devices to have a further communication interface connected, not necessarily physically, to the mobile data processing device, said one or more output devices rejecting acknowledging one or more acknowledgements $I_{RM}$, $I_{RM'}$, . . . of a control command $I_S$, for example confirmation or rejection thereof, in sensory fashion, e.g. by means of different types of vibrations.

It is possible for the confirmation or rejection of the input (control command $I_S$) by sensory acknowledgement e.g. by vibration to be received in an output device defined as a "wearable" that indirectly communicates with the infotainment system, even though the output device and the infotainment system use different communication interfaces in this case too.

The acknowledgements $I_{RM}$, $I_{RM'}$, . . . to the optional output devices that are totally independent of the motion sensing device can include a confirmation of the command or else rejection thereof and hence lead to different output reactions, which should be distinguishable "in sensory fashion", such as e.g. different vibration.

Since the actuated function or the actuated device itself does not provide an acknowledgement (feedback) in all cases (for example an audible feedback when changing station on the radio), additional concepts of forwarding a confirmation of the execution of an operation can be supported. In the simplest case, such confirmation may be a beep tone when a station is stored. Further forms of a feedback or acknowledgement are also possible in this context that can be provided in sensory fashion, for example. In this regard, output devices, that is to say devices that cause a sensory effect, may either be permanently installed in the vehicle, e.g. an air nozzle or the like, or be worn as a "wearable" on the body of the user, for example an elastic band. The feedbacks that are output by means of the output devices may be either confirmation or rejection of an input, this is to say of a control command Is. For example, said elastic band can momentarily contract somewhat or cause a specific vibration on the basis of an applicable acknowledgement $I_{RM}$ in the event of confirmation of a control command $I_S$, and can deliver an accordingly different acknowledgement in the event of rejection. These output devices can be connected to the data processing device via either wireless or wired communication interfaces. In particular, "wearables" are connected as output devices via BLE transponders and not permanently connected to the mobile data processing device or the infotainment system.

This form of sensory feedback does not adversely affect the driver's visual or auditory attention to the road traffic.

The output devices displaying confirmation of a command (control command $I_S$) are normally chosen such that they do not distract the driver. These may be e.g. bands that briefly contract, fans that briefly direct a warm or cold stream of air onto e.g. the hand of the driver or else electrical components that produce a stimulating current effect. Overall, that is to say a sensory feedback, which does not adversely affect the driver's attention through e.g. additional audiovisual stimuli.

The mobile data processing device may be set up to translate acknowledgement responses $I_{RA}$, as an alternative or addition to the responses $I_A$, into in each case one or more acknowledgements $I_{RM}$, $I_{RM'}$, . . . to one or more output devices and to transmit said acknowledgements via one or more further communication interfaces, the one or more acknowledgements $I_{RM}$, $I_{RM'}$, . . . being converted into sensory feedback, such as, by way of example, vibration, stream of air, stimulating current, audiovisual feedback, haptic feedback, etc., by the one or more output devices.

The intention is moreover to describe the use of a mobile data processing device for transmitting control commands $I_S$ of a motion sensing device to an infotainment system in a vehicle. The control commands $I_S$ sent by the motion sensing device are received by the mobile data processing device in the form of instructions $I_A$ via a first communication interface. Further, the received control commands $I_S$ are translated into the instructions $I_A$ to the infotainment system by the mobile data processing device, and the translated instructions $I_A$ are sent from the mobile data processing device to the infotainment system via a second communication interface. This is consistent with use of a mobile data processing device in the system described further above.

The motion sensing device and the infotainment system can be coupled to one another using the mobile data processing device by means of applicable manual inputs by the user on the mobile data processing device and/or the motion sensing device or the infotainment system. In this context, coupling means that the components are made known to one another and, following successful coupling via a communication channel, in this case that is to say the first or second communication interface, can interchange data or information. The couplings can also be made automatically, without manual inputs by the user. To this end, a program of the mobile data processing device, e.g. an app, can automatically look for the motion sensing device and/or the infotainment system, and coupling can be brought about automatically as soon as the search is successful. As is customary with wireless connections, encryption and/or password-protected coupling can be effected.

Equally, it is optionally possible for one or more output devices to be coupled to one another using the mobile data processing device by means of applicable manual inputs by the user on the mobile data processing device and/or the applicable output device. As described in the previous paragraph, the couplings can also be made automatically.

The intention is furthermore to describe a mobile data processing device, comprising a module that is set up to receive control commands $I_S$ from a motion sensing device via a first communication interface, to translate the received control commands $I_S$ into instructions $I_A$ to an infotainment system, and to send the translated instructions $I_A$ to the infotainment system via a second communication interface.

The module is preferably a program or a software program that is installed on the mobile data processing device. The module can receive the control commands $I_S$ by polling a first transponder (e.g. BLE transponder) for the first communication interface of the mobile data processing device, for example. This reception functionality may also be embodied as a standalone application that is connected to the module. If a control command $I_S$ has been received, it is evaluated by the module and checked to determine whether it is a valid control command $I_S$. The module detects the direction of the control command $I_S$, that is to say whether it is intended for the infotainment system. Subsequently, at least one control command $I_S$ is translated into at least one instruction $I_A$ to the infotainment system by the module. From the point of view of flow control, it may make sense for the forwarding of instructions $I_A$ to the infotainment system to be arranged in controlled fashion, in particular if acknowledgement responses $I_{RA}$ from the infotainment system to the mobile data processing device are supported. There are therefore situations in which a control command $I_S$ is still waiting in the mobile data processing device and a further control command $I_S$ is already received therein. In this case, the two can be translated together under certain circumstances, for example if both control commands contain navigation in the same direction and only the step size needs to be increased, for example instead of two commands for "shifting one position up" now only one command for "shifting two positions up". Hence, the mobile data processing device also achieves preprocessing and buffering. The instruction $I_A$ can be transmitted from the program to the infotainment system, by way of example, via a second transponder (e.g. WiFi transponder) for the second communication interface of the mobile data processing device. This transmission functionality may also be embodied as a standalone application that is connected to the module.

The module allows the mobile data processing device to be realized efficiently as a network node between the motion sensing device and the infotainment system. Neither the communication interface of the motion sensing device nor the communication interface of the infotainment system needs to be adjusted in any way. Said components can be used with one another immediately (out of the box) and without adjustments (plug and play) by means of the mobile data processing device according to the invention with the program as network node.

The mobile data processing device can comprise an operating system, e.g. Android, iOS, Windows mobile, etc. that can be used as a platform for the execution of the program according to the invention. The application for realizing the reception functionality and/or the transmission functionality can be provided by the operating system and can be used by the program of the mobile data processing device.

The intention is further to describe a method for transmitting control commands $I_S$ from a motion sensing device to an infotainment system in a vehicle, at least comprising the steps of:

a) sending the control commands $I_S$ to a mobile data processing device via a first communication interface, b) translating the control commands $I_S$ into instructions $I_A$ in the mobile data processing device, and c) sending the instructions $I_A$ from the mobile data processing device to the infotainment system via a second communication interface.

The motion sensing device can send the control commands $I_S$ via the first communication interface (e.g. BLE interface) by using a transponder (e.g. BLE transponder), and the mobile data processing device can receive the control commands $I_S$ by using a first transponder (e.g. BLE transponder). To translate the control commands $I_S$, the program of the mobile data processing device evaluates at least one received control command $I_S$ and translates it into at least one instruction $I_A$. In this case, a logic and length conversion can take place, which involves, by way of example, a control command $I_S$ of length 8 bits from a piece of control logic of the motion sensing device being converted into an instruction $I_A$ of length 4 bits from a piece of instruction logic of the infotainment system. However, it is also possible for the length and the logic of the control commands $I_S$ and of the applicable instructions $I_A$ to be identical and for the control commands $I_S$ to correspond to the instructions $I_A$.

The method according to the invention allows unproblematic communication between the motion sensing device and the infotainment system, so that the infotainment system can be controlled by the motion sensing device.

In the method for transmission, the step of translation can also involve multiple control commands $I_S$ together being translated into one or more instructions $I_A$.

The devices, components and methods described in the paragraphs above can also be used for communication in the opposite direction, that is to say the transmission and translation of acknowledgement responses $I_{RA}$ from the infotainment system into responses $I_R$ to the motion sensing device, and optionally as acknowledgements $I_{RM}$, $I_{RM}'$, ... to one or more output devices. The functionalities and properties used in this case are analogous to those described previously. The special advantages and exemplary embodiments explained in connection with the system are transferable to the described use, the described mobile data processing device and the described method in an analogous manner. The same applies to the advantages and exemplary embodiments described in connection with the use, data processing device and method, each of which are likewise applicable and transferable for all the described systems, uses, methods and devices.

BRIEF DESCRIPTION OF THE DRAWINGS

The invention and the technical field will be explained in more detail below on the basis of the figures. It should be pointed out that the figures show a particularly preferred variant embodiment of the invention, to which the invention is, however, not restricted. Identical components and functions are provided with the same reference signs in the figures, in which, by way of example and schematically.

DETAILED DESCRIPTION

Figure 1:
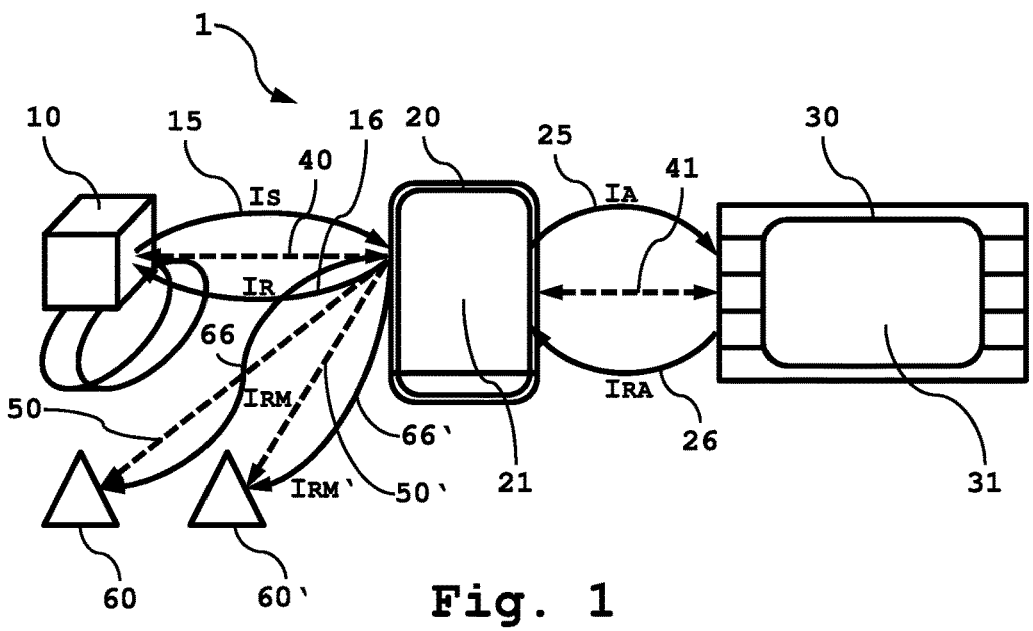
FIG. 1 shows a system according to the invention.

FIG. 1 shows a motion sensing device 10, in this case an armband for sensing muscle contractions in the lower arm of a user (Myo armband). Control commands $I_S$ 15 are generated by the motion sensing device 10 from detected movements and/or gestures of a user. The motion sensing device 10 sends the control commands $I_S$ 15 and receives responses $I_R$ 16. Both the control commands $I_S$ 15 and the responses $I_R$ 16 are transmitted via a first communication interface 40. The first communication interface 40 uses a Bluetooth Low Energy protocol (BLE protocol) for this. The first communication interface 40 communicatively connects the motion sensing device 10 to a mobile data processing device 20. The mobile data processing device 20 is a smartphone in this case. The mobile data processing device comprises a screen 21. The screen 21 can be used to display information in regard to coupling, existing connections and the like, inter alia. The mobile data processing device sends the responses $I_R$ 16 to the motion sensing device 10 and receives the control commands $I_S$ 15 from the motion sensing device 10 via the first communication interface 40. Instructions $I_A$ 25 are generated by the mobile data processing device 20 from the control commands $I_S$ 15. At this point, mapping onto the API prescribed by an infotainment system 30 takes place for the supported input operations. By way of example, the currently supported direction operations may differ from one infotainment system to another, e.g. in regard to granularity of the direction (8 directions or 12 directions) or in regard to intensity or step size in one direction. The responses $I_R$ 16 are generated by the mobile data processing device 20 from acknowledgement responses $I_{RA}$ 26. The mobile data processing device sends the instructions $I_A$ 25 and receives the acknowledgement responses $I_{RA}$ 26. Both the instructions $I_A$ 25 and the acknowledgement responses $I_{RA}$ 26 are transmitted via a second communication interface 41. The second communication interface 41 uses a Wireless Fidelity protocol (WiFi protocol) for this. The second communication interface 41 communicatively connects the mobile data processing device 20 to an infotainment system 30. The infotainment system 30 is depicted as a combination system comprising navigation system, DVD player, radio, on-board computer and mobile radio unit by way of example in this case. The infotainment system 30 can also comprise any selection of said components (navigation system, DVD player, radio, onboard computer, mobile radio unit). The infotainment system 30 comprises a touch-sensitive screen (touchscreen) 31. The screen 31 can be used to display information in regard to coupling, existing connections and the like, and also information from the infotainment system 30 (roadmap with navigation advice/visualizations, DVD films/tracks, radio stations, information from the on-board computer, information about the connected smartphone, etc.), inter alia. Further, FIG. 1 shows the optional output devices 60, 60', which each have a further communication interface 50, 50' to the mobile data processing device 20. On obtaining e.g. a confirmation report in the form of an acknowledgement response $I_{RA}$ 26 via the communication interface 41, the mobile data processing device 20 uses the communication interfaces 50, 50' to send respective acknowledgements $I_{RM}$ 66, $I_{RM}'$ 66'. It is alternatively possible for rejections of the command to be passed on in this way.

The motion sensing device 10 sends control commands $I_S$ 15 to the mobile data processing device 20 and receives responses $I_R$ 16. The infotainment system 30 sends the acknowledgement responses $I_{RA}$ 26 to the mobile data processing device 20 and receives the instructions $I_A$ 25 from the mobile data processing device 20 via the second communication interface 41. In this case, the mobile data processing device 20 can make adjustments for the purpose of flow control toward the infotainment system 30.

The instructions $I_A$ 25 are converted into specific actions by the infotainment system 30 and, as a result, information is output (sound and/or image), or are executed as functions (e.g. navigation in a menu, changing tracks or stations and the like). As confirmation of successful execution of at least one instruction $I_A$ 25, the infotainment system uses an acknowledgement (feedback) to send at least one acknowledgement response $I_{RA}$ 26 to the mobile data processing device 20 via the second communication interface 41. The response $I_R$ 16 or the acknowledgement response $I_{RA}$ 26 can be evaluated from at least four aspects:

1. The acknowledgement response $I_{RA}$ 26 can be used for local flow control in the mobile data processing device 20 in regard to the sending of instructions $I_A$ 25 to the infotainment system 30.

2. The response $I_R$ 16 can be used for local flow control in the motion sensing device 10 in regard to the sending of instructions $I_S$ 15 to the mobile data processing device 20.

3. The acknowledgement response $I_{RA}$ 26 can initiate the sending of the response $I_R$ 16 to the motion sensing device 10 for the purpose of output of a sensory effect, e.g. in regard to confirmation or rejection of a control command $I_S$ 15.

4. The acknowledgement response $I_{RA}$ 26 can initiate the sending of acknowledgements $I_{RM}$ 66, $I_{RM}'$ 66' to the output devices 60, 60' for the purpose of output of sensory effects, e.g. in regard to confirmation or rejection of a control command $I_S$ 15.

Figure 2:
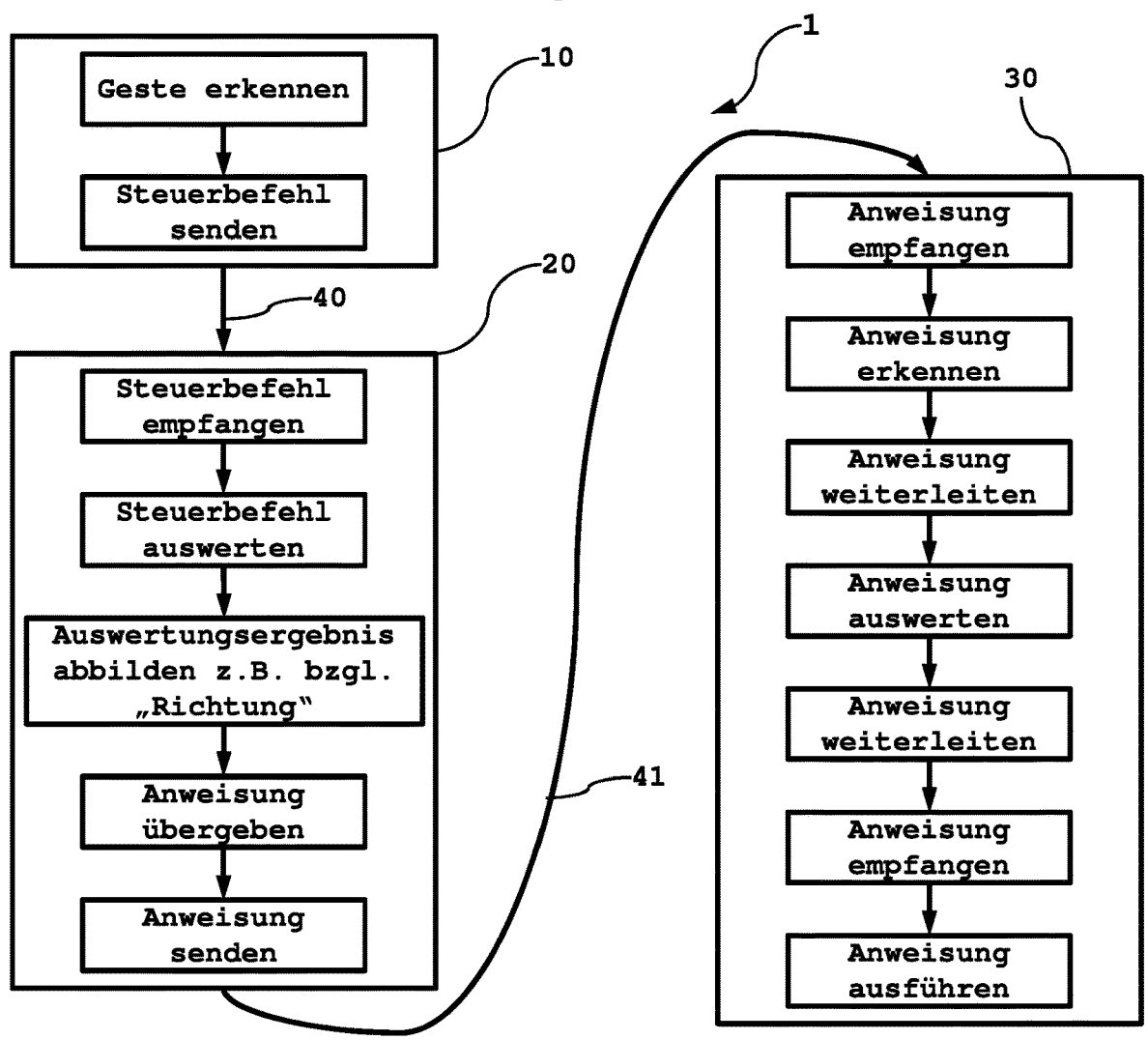
FIG. 2 shows a sequence for the use of a mobile data processing device as a network node in accordance with the invention.

FIG. 2 shows the sequence for the control of the infotainment system 30 by the motion sensing device 10 using the mobile data processing device 20. The motion sensing device 10 detects a movement and/or gesture. The detected movement and/or gesture is converted into at least one control command $I_S$ 15. The control command $I_S$ 15 is transmitted to the mobile data processing device 20 via the first communication interface 40 by a BLE transceiver of the motion sensing device 10, for example. The mobile data processing device 20 receives the control command $I_S$ 15, by way of example, via a BLE transceiver of the mobile data processing device 20 using a BLE application of the mobile data processing device 20. The control command $I_S$ 15 is evaluated by a program on the mobile data processing device 20 and converted into an instruction $I_A$ 25 in the process. Subsequently, the program maps the control command $I_S$ 15 or the instruction $I_A$ 25, that is to say the evaluation result, for example on instruction in regard to "direction" and/or "intensity". This involves instructions $I_A$ that are already waiting and have not yet been processed further being included in the mapping as well, so that in the possible event of there being two or more identical instructions $I_A$, these are mapped into a single instruction $I_A$ having an appropriately adjusted step size. The instruction $I_A$ 25 is transferred to a WiFi application of the mobile data processing device 20 and, by way of example, transmitted to the infotainment system 30 via the second communication interface 41 by a WiFi transceiver of the mobile data processing device 20 using a WiFi application of the mobile data processing device 20. The infotainment system 30 receives the instruction $I_A$ 25, by way of example, via a WiFi transceiver of the infotainment system 30 using a WiFi application of the infotainment system 30. The instruction $I_A$ 25 is detected by the infotainment system 30 and forwarded to an input event handling process. The input event handling process receives the instruction $I_A$ 25 and evaluates it in regard to the action to be accomplished (functionality). The input event handling process forwards the instruction $I_A$ 25 to an applicable processing process in a local representation of a generic interface for instruction $I_A$ 25 (input event). The processing process, for example an application process responsible for media, obtains the input event (corresponding to the instruction $I_A$ 25), e.g. "next track", which results in the current music track being changed to the next. In this case, the application process cannot distinguish whether the input event comes from the motion sensing device or, for example, an input via the touch-sensitive screen 31 of the infotainment system itself. Control of the infotainment system by means of inputs on the mobile data processing device 20 is also possible. Finally, the infotainment system 30 executes the input event and therefore the instruction $I_A$ 25 and starts playing the next music track.

An analogous sequence of the communication between infotainment system 30 and motion sensing device 10 or for the optional output devices 60, 60' via the mobile data processing device 20 is obtained for the aforementioned acknowledgement to confirm successfully executed instructions $I_A$ 25 by detection of gestures.

The invention claimed is:

1. A system comprising: a vehicle having an infotainment system having a touch-sensitive screen, a mobile data processing device having a display screen for displaying information in regard to coupling and existing connections, and a motion sensing device that is configured to be worn by a driver of the vehicle, wherein a first communication interface is set up to transmit control commands Is from the motion sensing device to the mobile data processing device, the mobile data processing device is set up to translate the control commands Is into instructions IA to the infotainment system, the mobile data processing device is set up to translate acknowledgement responses into responses to the motion sensing device wherein the acknowledgements being converted into sensory feedback, and a second communication interface is set up to transmit the instructions IA from the mobile data processing device to the infotainment system.

2. The system as claimed in claim 1, wherein the mobile data processing device is set up to combine multiple control commands $I_S$ into one or more instructions $I_A$.

3. The system as claimed in claim 2, wherein the first communication interface is set up to use a Bluetooth Low Energy protocol, and the second communication interface is set up to use a Bluetooth or Wireless Fidelity or USB protocol or a radio transmission.

4. The system as claimed in claim 2, wherein the control commands $I_S$ are provided for navigating and selecting functions and/or information of the infotainment system.

5. The system as claimed in claim 2, wherein the second communication interface is set up to transmit acknowledgement responses $I_{RA}$ from the infotainment system to the mobile data processing device, the mobile data processing device is set up to translate acknowledgement responses $I_{RA}$ into responses $I_R$ to the motion sensing device, and the first communication interface is set up to transmit the responses $I_R$ from the mobile data processing device to the motion sensing device.

6. The system as claimed in claim 2, wherein the mobile data processing device is set up to translate acknowledgement responses $I_{RA}$, as an alternative or addition to the responses $I_A$, into in each case one or more acknowledgements $I_{RM}$, $I_{RM}'$ to one or more output devices, and to transmit said acknowledgements via one or more further communication interfaces, the one or more acknowledgements $I_{RM}$, $I_{RM}'$ being converted into sensory feedback by the one or more output devices.

7. The system as claimed in claim 1, wherein the first communication interface is set up to use a Bluetooth Low Energy protocol, and the second communication interface is set up to use a Bluetooth or Wireless Fidelity or USB protocol or a radio transmission.

8. The system as claimed in claim 7, wherein the control commands $I_S$ are provided for navigating and selecting functions and/or information of the infotainment system.

9. The system as claimed in claim 7, wherein the second communication interface is set up to transmit acknowledgement responses $I_{RA}$ from the infotainment system to the mobile data processing device, the mobile data processing device is set up to translate acknowledgement responses $I_{RA}$ into responses $I_R$ to the motion sensing device, and the first communication interface is set up to transmit the responses $I_R$ from the mobile data processing device to the motion sensing device.

10. The system as claimed in claim 7, wherein the mobile data processing device is set up to translate acknowledgement responses $I_{RA}$, as an alternative or addition to the responses $I_A$, into in each case one or more acknowledgements $I_{RM}$, $I_{RM}'$ to one or more output devices, and to transmit said acknowledgements via one or more further communication interfaces, the one or more acknowledgements $I_{RM}$, $I_{RM}'$ being converted into sensory feedback by the one or more output devices.

11. The system as claimed in claim 1, wherein the control commands $I_S$ are provided for navigating and selecting functions and/or information of the infotainment system.

12. The system as claimed in claim 11, wherein the mobile data processing device is set up to translate acknowledgement responses $I_{RA}$, as an alternative or addition to the responses $I_A$, into in each case one or more acknowledgements $I_{RM}$, $I_{RM}'$ to one or more output devices, and to transmit said acknowledgements via one or more further communication interfaces, the one or more acknowledgements $I_{RM}$, $I_{RM}'$ being converted into sensory feedback by the one or more output devices.

13. The system as claimed in claim 11, wherein the second communication interface is set up to transmit acknowledgement responses $I_{RA}$ from the infotainment system to the mobile data processing device, the mobile data processing device is set up to translate acknowledgement responses $I_{RA}$ into responses $I_R$ to the motion sensing device, and the first communication interface is set up to transmit the responses $I_R$ from the mobile data processing device to the motion sensing device.

14. The system as claimed in claim 1, wherein the second communication interface is set up to transmit acknowledgement responses $I_{RA}$ from the infotainment system to the mobile data processing device, the mobile data processing device is set up to translate acknowledgement responses $I_{RA}$ into responses $I_R$ to the motion sensing device, and the first communication interface is set up to transmit the responses $I_R$ from the mobile data processing device to the motion sensing device.

15. A use of a mobile data processing device, having a display screen for displaying information in regard to coupling and existing connections, for transmitting control commands Is of a motion sensing device that is configured to be worn by a driver of a vehicle to an infotainment system, having a touch-sensitive screen, in the vehicle in the form of instructions IA, wherein the control commands Is sent by the motion sensing device are received by the mobile data processing device via a first communication interface, the received control commands Is are translated into the instructions IA to the infotainment system by the mobile data processing device, the mobile data processing device is set up to translate acknowledgement responses into responses to the motion sensing device wherein the acknowledgements being converted into sensory feedback, and the translated instructions $I_A$ are sent from the mobile data processing device to the infotainment system via a second communication interface.

16. A method for transmitting control commands Is from a motion sensing device that is configured to be worn by a driver of a vehicle to an infotainment system having a touch-sensitive screen in the vehicle, at least comprising the steps of: a) sending the control commands Is to a mobile data processing device, having a display screen for displaying information in regard to coupling and existing connections, via a first communication interface, b) translating the control commands Is into instructions $I_A$ in the mobile data processing device, the mobile data processing device is set up to translate acknowledgement responses into responses to the motion sensing device wherein the acknowledgements being converted into sensory feedback and c) sending the instructions IA from the mobile data processing device to the infotainment system via a second communication interface.

* * * * *